United States Patent
Kobori

(10) Patent No.: US 9,528,028 B2
(45) Date of Patent: Dec. 27, 2016

(54) METHOD FOR PREPARING MODIFIED SILICA FILM AND MODIFIED SILICA FILM PREPARED FROM THE SAME

(71) Applicant: Shigeto Kobori, Kanagawa (JP)

(72) Inventor: Shigeto Kobori, Kanagawa (JP)

(73) Assignee: CHEIL INDUSTRIES, INC., Gumi-Si, Gyeongsangbuk-Do (KR)

( * ) Notice: Subject to any disclaimer, the term of this patent is extended or adjusted under 35 U.S.C. 154(b) by 79 days.

(21) Appl. No.: 14/264,448

(22) Filed: Apr. 29, 2014

(65) Prior Publication Data

US 2014/0323630 A1  Oct. 30, 2014

(30) Foreign Application Priority Data

Apr. 30, 2013 (JP) .................................. 2013-095963
Jul. 25, 2013 (KR) ........................ 10-2013-0088352

(51) Int. Cl.
*C09D 183/16* (2006.01)
*C08G 77/62* (2006.01)

(52) U.S. Cl.
CPC ............. *C09D 183/16* (2013.01); *C08G 77/62* (2013.01)

(58) Field of Classification Search
CPC .................................................. C09D 183/16
USPC .................................. 524/366, 378; 427/387
See application file for complete search history.

(56) References Cited

FOREIGN PATENT DOCUMENTS

| CN | 1694936 A | 11/2005 |
|---|---|---|
| CN | 102575013 A | 7/2012 |
| JP | 08-027425 | 1/1996 |
| JP | 2006-082341 | 3/2006 |
| JP | 2010-137372 A | 6/2010 |
| TW | 416260 B | 12/2000 |
| TW | 200307280 A | 12/2003 |
| TW | 201245045 A | 11/2012 |

OTHER PUBLICATIONS

KY-100 Series Product Data Sheet, Shin Etsu Chemical Co. (2013).*
MSDS Novec HFE-7200 (2004).*
Chinese Office Action dated Dec. 25, 2015.
Taiwanese Office Action dated Oct. 21, 2015.
Korean Office Action dated Sep. 18, 2015 in Corresponding Korean Patent Application No. 10-2013-0088352.

* cited by examiner

*Primary Examiner* — Edward Cain
(74) *Attorney, Agent, or Firm* — Lee & Morse, P.C.

(57) ABSTRACT

A method for preparing a modified silica film includes preparing a reactive fluorine-containing polymer solution by dissolving a reactive fluorine-containing polymer including a bonding group bondable to polysilazane in a fluorine-containing solvent, preparing a polysilazane solution by dissolving polysilazane in a solvent for polysilazane, the solvent for polysilazane being immiscible with the fluorine-containing solvent and exhibiting a higher surface tension than the reactive fluorine-containing polymer and the fluorine-containing solvent, preparing a coating liquid by mixing the polysilazane solution with the reactive fluorine-containing polymer solution, forming a coating layer by coating the coating liquid onto a substrate, removing the solvent for polysilazane and the fluorine-containing solvent from the coating layer, and converting the polysilazane into silica while bonding the bonding group of the reactive fluorine-containing polymer to the polysilazane.

20 Claims, 5 Drawing Sheets

METHOD FOR PREPARING MODIFIED SILICA FILM AND MODIFIED SILICA FILM PREPARED FROM THE SAME

CROSS-REFERENCE TO RELATED APPLICATION

Japanese Patent Application No. 2013-095963, filed on Apr. 30, 2013, in the Japanese Intellectual Property Office, and entitled: "Method for Preparing Modified Silica Film and Modified Silica Film Prepared from the Same," is incorporated by reference herein in its entirety.

Korean Patent Application No. 10-2013-0088352, filed on Jul. 25, 2013, in the Korean Intellectual Property Office, and entitled: "Method for Preparing Modified Silica Film and Modified Silica Film Prepared from the Same," is incorporated by reference herein in its entirety.

BACKGROUND

1. Field

Embodiments relate to a method for preparing a modified silica film and a modified silica film prepared using the same.

2. Description of the Related Art

A silica film prepared by silica conversion (for example, curing) of polysilazane may exhibit strength close to that of glass. Silica films may be used to improve the surface strength of various films. Recently, there is an increasing need for improving surface strength of an optical film using the silica film. Here, the optical film is, for example, an anti-reflective film bonded to a surface of a display.

SUMMARY

Embodiments are directed to a method for preparing a modified silica film including providing a reactive fluorine-containing polymer solution, the reactive fluorine-containing solution including a fluorine-containing solvent and a reactive fluorine-containing polymer including a bonding group bondable to polysilazane, the reactive fluorine-containing polymer being dissolved in the fluorine-containing solvent, providing a polysilazane solution, the polysilazane solution including a polysilazane and a solvent for polysilazane, the solvent for polysilazane being immiscible with the fluorine-containing solvent and exhibiting a higher surface tension than the reactive fluorine-containing polymer and the fluorine-containing solvent, the polysilazane being dissolved in the solvent for polysilazane, preparing a coating liquid by mixing the polysilazane solution with the reactive fluorine-containing polymer solution, forming a coating layer by coating the coating liquid onto a substrate, removing the solvent for polysilazane and the fluorine-containing solvent from the coating layer, and converting the polysilazane into silica while bonding the bonding group of the reactive fluorine-containing polymer to the polysilazane.

A difference in surface tension calculated by subtracting a larger surface tension of two surface tensions of the reactive fluorine-containing polymer and the fluorine-containing solvent from surface tension of the solvent for polysilazane may be about 5 mN/m or more.

The solvent for polysilazane may be a hydrophobic and non-polar organic solvent.

The solvent for polysilazane may include at least one selected from the group of dibutylether, xylene, mineral turpentine, petroleum hydrocarbons, and aromatic hydrocarbons with a high boiling point.

The fluorine-containing solvent may include a hydrofluoroether.

A weight ratio of the polysilazane to the reactive fluorine-containing polymer in the coating liquid may range from about 99:1 to about 90:10.

The reactive fluorine-containing polymer solution may include about 1 wt % to about 30 wt % of the reactive fluorine-containing polymer based on a total weight of the reactive fluorine-containing polymer solution.

The fluorine-containing solvent may have a boiling point of about 61° C. or more.

Embodiments are also directed to a coating liquid including polysilazane, a reactive fluorine-containing polymer, a solvent for polysilazane, and a fluorine-containing solvent. A difference in surface tension calculated by subtracting a larger surface tension of two surface tensions of the reactive fluorine-containing polymer and the fluorine-containing solvent from surface tension of the solvent for polysilazane may be about 5 mN/m or more.

The solvent for polysilazane may be a hydrophobic and non-polar organic solvent.

The solvent for polysilazane may include at least one selected from the group of dibutylether, xylene, mineral turpentine, petroleum hydrocarbons, and aromatic hydrocarbons with a high boiling point.

The fluorine-containing solvent may include a hydrofluoroether.

The fluorine-containing solvent may have a surface tension of about 15 mN/m or less and a boiling point of about 61° C. or more.

The coating liquid may further include an amine catalyst.

A weight ratio of the polysilazane to the reactive fluorine-containing polymer in the coating liquid may range from about 99:1 to about 90:10.

The reactive fluorine-containing polymer solution may include about 1 wt % to about 30 wt % of the reactive fluorine-containing polymer based on a total weight of the reactive fluorine-containing polymer solution.

Embodiments are also directed to a modified silica film prepared by the method for preparing a modified silica film as disclosed above.

A difference in surface tension calculated by subtracting a larger surface tension of two surface tensions of the reactive fluorine-containing polymer and the fluorine-containing solvent from surface tension of the solvent for polysilazane may be about 5 mN/m or more.

The fluorine-containing solvent may include a hydrofluoroether.

The fluorine-containing solvent may have a boiling point of 61° C. or more.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
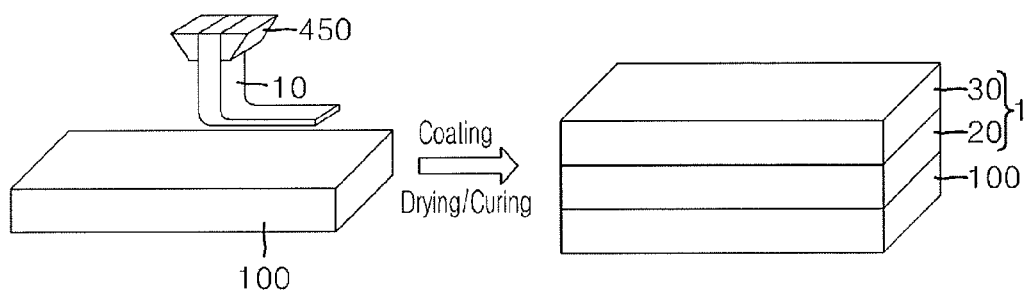
FIG. 1 illustrates a diagram of a method for preparing a modified silica film and a modified silica film according to one embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

Hereinafter, exemplary embodiments will be described in detail with reference to the accompanying drawings. Like components will be denoted by like reference numerals throughout the specification, and repeated descriptions thereof will be omitted. Further, surface tension is a value at 25° C. and is given in mN/m. Surface tension is measured, for example, by an automatic surface tensiometer (DY-300, Kyowa Interface Science Co., Ltd.). In the following examples, surface tension was measured using a DY-300 (Kyowa Interface Science Co., Ltd.). The surface tension may also be measured by other methods known in the art.
Method for Preparing Modified Silica Film First, referring to FIGS. 1 to 3, a method for preparing a modified silica film according to one embodiment will be described in detail.

Figure 2:
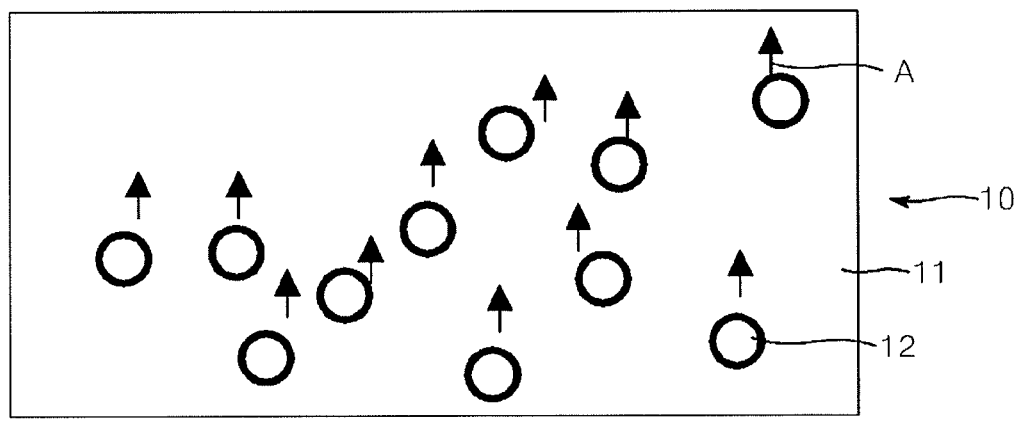
FIG. 2 illustrates a diagram of a coating liquid according to one embodiment.

A polysilazane solution 11 shown in FIG. 2 may be prepared by dissolving polysilazane in a solvent for polysilazane. A reactive fluorine-containing polymer solution 12 may be prepared by dissolving a reactive fluorine-containing polymer 13 in a fluorine-containing solvent 14. The preparing of the polysilazane solution 11 and the preparing of the reactive fluorine-containing polymer solution 12 may be performed in any order.

As shown in FIG. 2, a coating liquid 10 may be prepared by mixing the polysilazane solution 11 with the reactive fluorine-containing polymer solution 12. As shown in FIG. 1, a coating layer may be formed by coating the coating liquid 10 onto a substrate 100. The solvent for polysilazane and the fluorine-containing solvent 14 may be removed from the coating layer. The polysilazane may be converted into silica while the reactive fluorine-containing polymer may be bonded to the polysilazane. Through this method, a modified silica film 1 may be formed on the substrate 100. The modified silica film 1 may include a hard coating layer 20 including the silica, and a protective layer 30 including the reactive fluorine-containing polymer. According to one embodiment, the hard coating layer 20 and the protective layer 30 including the reactive fluorine-containing polymer may be prepared by one-layer coating of the coating liquid. Hereinafter, the method of preparing the modified silica film will be described in detail.

The polysilazane solution 11 may be prepared by dissolving the polysilazane in the solvent for polysilazane.

Polysilazane is an inorganic polymer that is also referred to as perhydropolysilazane. Polysilazane has a structure represented by Formula 1:

  [Formula 1]

wherein n is a natural number, for example, from 4 to 2,000.

The polysilazane may be selected to have as low a weight average molecular weight as feasible to avoid precipitation. A polysilazane having a higher weight average molecular weight may be more easily precipitated as crystals in the polysilazane solution 11.

The solvent for polysilazane may be a solvent that dissolves the polysilazane, is immiscible with the fluorine-containing solvent 14, and has a higher surface tension than the reactive fluorine-containing polymer 13 and the fluorine-containing solvent 14. When the solvent for polysilazane satisfies these characteristics, the reactive fluorine-containing polymer solution 12 of the coating layer may bleed to a surface of the coating layer. That is, the reactive fluorine-containing polymer solution 12 may be attracted towards air.

Figure 3:
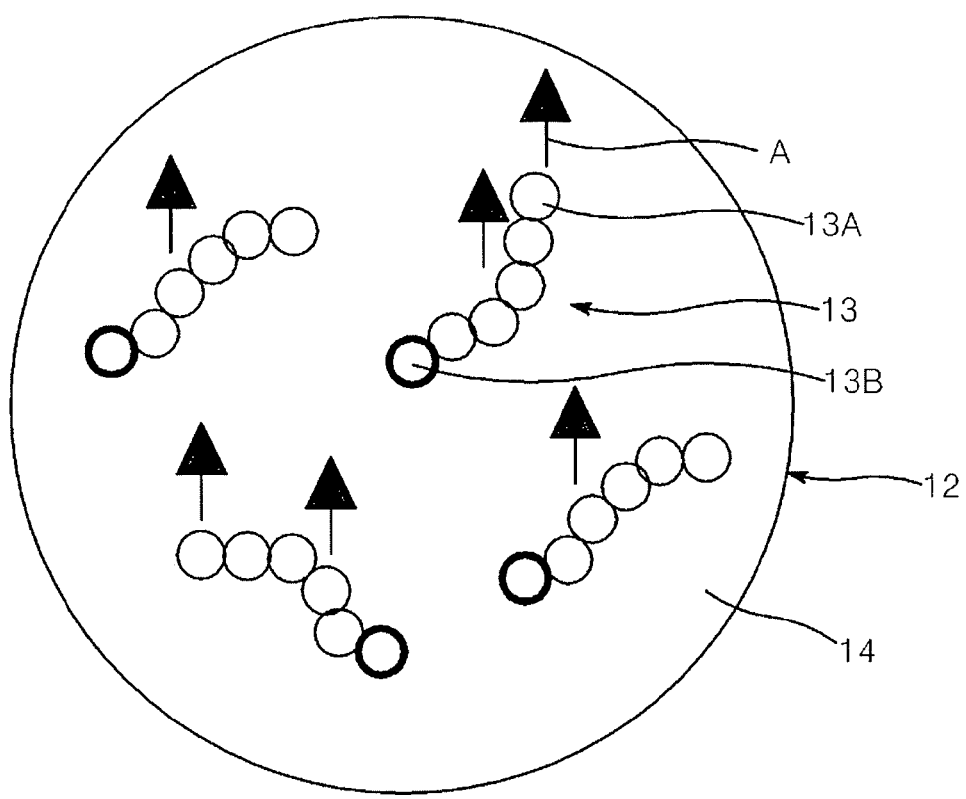
FIG. 3 illustrates a diagram of capsule of reactive fluorine-containing polymer solution dispersed in a coating liquid.

As shown in FIGS. 2 and 3, if the solvent for polysilazane is immiscible with the fluorine-containing solvent 14, the reactive fluorine-containing polymer solution 12 may be present in the coating liquid 10 in a fine capsule form (for example, as a micelle). In addition, reaction of the reactive fluorine-containing polymer 13 with polysilazane may also be suppressed. Further, the polysilazane solvent may have a higher surface tension than each one of the reactive fluorine-containing polymer 13 and the fluorine-containing solvent 14. A repulsive force due to the solvent for polysilazane may also act on the capsule of the reactive fluorine-containing polymer solution 12. Thus, the reactive fluorine-containing polymer solution 12 may bleed to the surface of the coating layer. The arrow A of FIGS. 2 and 3 illustrates the reactive fluorine-containing polymer solution 12 bleeding to the surface of the coating layer.

A difference between the surface tension of the solvent for polysilazane and the surface tensions of the reactive fluorine-containing polymer 13 and the fluorine-containing solvent 14 may be selected to be as large as possible. As the difference in surface tension increases, the reactive fluorine-containing polymer solution 12 more easily bleeds to the surface of the coating layer. The difference in surface tension may be about 5 or more, for example, from about 5.5 to about 10, for example, 5, 5.5, 6, 6.5, 7, 7.5, 8, 8.5, 9, 9.5, or 10, as calculated by subtracting the larger tension of the two surface tensions of the reactive fluorine-containing polymer 13 and the fluorine-containing solvent 14 from the surface tension of the solvent for polysilazane.

The solvent for polysilazane satisfying the above characteristics may include, for example, a hydrophobic and non-polar organic solvent. Such an organic solvent may include dibutyl ether, xylene, mineral turpentine, petroleum hydrocarbons, and aromatic hydrocarbons with high boiling point, as example. The aromatic hydrocarbons with high boiling point may has a boiling point in the range of about 110° C. to about 180° C., for example, about 120° C. to about 160° C. For example, the solvent for polysilazane may include at least one selected from the group of dibutyl ether, xylene, mineral turpentine, petroleum hydrocarbons, and aromatic hydrocarbons with high boiling point. Dibutyl ether has a surface tension of about 22.4, xylene has a surface tension of about 30.0, and mineral turpentine has a surface tension of about 25.0.

The polysilazane solution 11 may include an additive that does not deteriorate polysilazane. For example, the polysilazane solution 11 may include an amine catalyst. If the polysilazane solution 11 includes the amine catalyst, silica conversion of the polysilazane can be performed at room temperature. Although polysilazane may also be converted into silica when heated to about 300° C. to about 400° C., an optical film provided as a substrate may suffer from thermal stress. Thus, for example, in order to prevent the optical film from suffering from thermal stress, the amine catalyst may be added to the polysilazane solution 11.

In addition, the solvent for polysilazane may have as low a moisture content as feasible. The moisture content of the solvent for polysilazane refers to a percent of water expressed in % by weight (wt %) based on a total weight of the solvent for polysilazane. For example, the solvent for polysilazane may have a moisture content of less than about 1 wt %, for example, close to 0 wt %. Moisture in the solvent for polysilazane may cause silica conversion of the polysilazane. Such silica conversion may deteriorate the quality of the modified silica film 1.

The reactive fluorine-containing polymer solution 12 may be prepared by dissolving the reactive fluorine-containing polymer 13 in the fluorine-containing solvent 14.

As shown in FIG. 3, the reactive fluorine-containing polymer 13 may include a fluorine-containing polymer backbone 13A and a bonding group 13B. The reactive fluorine-containing polymer 13 may be represented by Formula 2:

$$[(Rf2)\text{-}(W2)]_n\text{-}SiX_{(4-n)}, \qquad \text{[Formula 2]}$$

wherein Rf2 is a (per)fluoroalkyl group or a (per)fluoropolyether, W2 is a linking group, forming the fluorine-containing polymer backbone 13A, and X is the bonding group 13B. n may be a natural number from 1 to 3.

The (per)fluoroalkyl group may have limitation suitable structure. The (per)fluoroalkyl group may have a linear structure (for example, $-CF_2CF_3$, $-CH_2(CF_2)_4H$, $-CH_2(CF_2)_8CF_3$, $-CH_2CH_2(CF_2)_4H$, or the like), a branched structure (for example, $CH(CF_3)_2$, $CH_2CF(CF_3)_2$, $CH(CH_3)CF_2CF_3$, $CH(CH_3)(CF_2)_5CF_2H$, or the like), or an alicyclic structure (for example, a five-membered or six-membered cyclic structure, such as a perfluorocyclohexyl group, a perfluorocyclopentyl group, an alkyl group substituted with a perfluorocyclohexyl group and/or a perfluorocyclopentyl group, or the like).

The (per)fluoropolyether group may be a (per)fluoroalkyl group having an ether linkage. The (per)fluoropolyether group may have a suitable structure. For example, the (per)fluoropolyether group may include $CH_2OCH_2CF_2CF_3$, $CH_2CH_2OCH_2C_4F_8H$, $CH_2CH_2OCH_2CH_2C_8F_{17}$, $CH_2CH_2OCF_2CF_2OCF_2CF_2H$, a $C_4$ to $C_{20}$ fluorocycloalkylether group including at least five fluorine atoms, or the like. In addition, as other examples, the (per)fluoropolyether group may include $(CF_2)_xO(CF_2CF_2O)_y$, $[CF(CF_3)CF_2O]_x$ $-[CF_2(CF_3)]$, $(CF_2CF_2CF_2O)_x$, $(CF_2CF_2O)_x$, and the like. Here, x and y may be a natural number.

When Rf2 is a (per)fluoroalkyl group, the linking group may be a divalent functional group having at least an ether linkage. Such a divalent functional group may include materials obtained by replacing the terminal methyl group of the aforementioned materials of the (per)fluoropolyether group with a methylene group, or the like. When Rf2 is a (per)fluoropolyether group, the linking group may include, for example, methylene, phenylene, alkylene, arylene, heteroalkylene groups, or combinations thereof. The linking group may include carbonyl, carbonyloxy, carbonylimino, sulfonamide groups, combinations thereof, or the like. A photopolymerizable functional group may include acryloyl groups, methacryloyl groups, or the like. Thus, the fluorine-containing polymer backbone 13A may become a (per)fluoropolyether group as a whole.

The bonding group 13B may be a functional group bondable to the polysilazane, for example, a $C_1$ to $C_4$ alkoxy group, a silanol group (hydroxyl group), halogen, or hydrogen. n may be an integer from 1 to 3. The reactive fluorine-containing polymer 13 may have a weight average molecular weight of, for example, about 10,000 g/mol or more.

The reactive fluorine-containing polymer 13 may have an extremely low surface tension of, for example, about 16.5 or less. A difference in surface tension between the solvent for polysilazane and the reactive fluorine-containing polymer 13 may be about 5 or more, for example, from about 5.5 to about 10, for example, about 5, 5.5, 6, 6.5, 7, 7.5, 8, 8.5, 9, 9.5, or 10.

The fluorine-containing solvent 14 is an organic solvent that includes fluorine. The fluorine-containing solvent may have a boiling point of about 61° C. or more, for example, from about 61° C. to about 100° C. For example, if the fluorine-containing solvent 14 has a boiling point of less than 61° C., the modified silica film 1 may be deteriorated with respect to antifouling properties. The fluorine-containing solvent 14 may include hydrofluoroethers, or the like. The hydrofluoroether may include a hydrofluoroether having three or more of fluorine atoms in a molecule, for example, a hydrofluoroether having five or more of fluorine atoms in a molecule, for example, a hydrofluoroether having seven or more of fluorine atoms in a molecule or, for example, a hydrofluoroether having nine or more of fluorine atoms in a molecule. The hydrofluoroether may also include unsaturated bond.

The hydrofluoroether having three or more of fluorine atoms in a molecule may have four or more to less than seven carbon atoms in the hydrofluoroether. If the hydrofluoroether having three or more of fluorine atoms in a molecule has seven or more of carbon atoms, it cannot have the high boiling point.

The fluorine-containing solvent 14 may include at least one selected from these solvents. The fluorine-containing solvent 14 also may have an extremely low surface tension of, for example, about 15 or less, for example, from about 13.6 to about 15 of, for example, about 13, 13.5, 14, 14.5, or 15. A difference in surface tension between the solvent for polysilazane and the fluorine-containing solvent 14 may be about 5 or more, for example, from about 5.5 to about 10.

The reactive fluorine-containing polymer solution 12 may have a concentration, i.e. a weight percent of the reactive fluorine-containing polymer 13 expressed in wt %, of from about 1 wt % to about 30 wt %, based on a total weight of the reactive fluorine-containing polymer solution 12. If the concentration of the reactive fluorine-containing polymer solution 12 is less than 1 wt %, that is, if an excess of the fluorine-containing solvent 14 is present as compared with the reactive fluorine-containing polymer 13, the reactive fluorine-containing polymer solution 12 may not be stably present in the coating liquid 10. For example, the polysilazane solution 11 may be completely separated from the reactive fluorine-containing polymer solution 12 in the coating liquid 10. The reactive fluorine-containing polymer solution 12 may be separated from the polysilazane solution 11 as a liquid layer, instead of being dispersed in the polysilazane solution 11 in capsule form. As a result, the coating liquid 10 may suffer from white turbidity. In addition, the silica, after silica conversion, may be reduced in cross-linking density, and the modified silica film may be reduced in strength.

On the other hand, if the concentration of the reactive fluorine-containing polymer solution 12 is greater than 30 wt %, that is, if an excess of the reactive fluorine-containing polymer 13 is present as compared with the fluorine-containing solvent 14, there is a possibility that the reactive fluorine-containing polymer 13 of the coating liquid 10 may react with the polysilazane. That is, the silica, after silica conversion, may be reduced in cross-linking density, and the modified silica film may be reduced in strength.

According to the following embodiments, the reactive fluorine-containing polymer solution 12 may have a concentration of from about 3 wt % to about 20 wt %, for example, from about 5 wt % to about 10 wt %, or, for example, about 3, 4, 5, 6, 7, 8, 9, 10, 11, 12, 13, 14, 15, 16, 17, 18, 19, or 20.

The coating liquid 10 may be prepared by mixing the polysilazane solution 11 with the reactive fluorine-containing polymer solution 12.

If a reactive fluorine-containing polymer were to be added to a polysilazane solution without dissolving the reactive fluorine-containing polymer, the bonding group of the reactive fluorine-containing polymer 13 could react with the polysilazane. A reaction site of the polysilazane reacting with the reactive fluorine-containing polymer 13 might not be cross-linked with a surrounding silica skeleton upon silica conversion. The modified silica film may be reduced in cross-linking density, and thus reduced in strength.

According to embodiments, the reactive fluorine-containing polymer solution 12 may be prepared by dissolving the reactive fluorine-containing polymer 13 in the fluorine-containing solvent 14. In addition, as shown in FIG. 2, the coating liquid 10 may be prepared by mixing the polysilazane solution 11 with the reactive fluorine-containing polymer solution 12. The solvent for polysilazane may be immiscible with the fluorine-containing solvent 14. Accordingly, the reactive fluorine-containing polymer solution 12 may be present in the coating liquid 10 in capsule form. The reactive fluorine-containing polymer 13 may be present in the fluorine-containing solvent 14, and thus may be suppressed from reacting with the polysilazane. Similarly, the fluorine-containing solvent 14 also may not react with the polysilazane. Thus, the polysilazane may be stably present in the coating liquid 10. Storage stability of the coating liquid 10 may be secured.

The reactive fluorine-containing polymer solution 12 may have a much lower surface tension (that is, the surface tension of the reactive fluorine-containing polymer 13 and the surface tension of the fluorine-containing solvent 14) than the solvent for polysilazane. A repulsive force due to the polysilazane solution 11 may also act on the reactive fluorine-containing polymer solution 12. Thus, reactive fluorine-containing polymer solution 12 may bleed to the surface of the coating layer.

The coating liquid 10 may have a weight ratio of the polysilazane to the reactive fluorine-containing polymer 13 of from about 99:1 to about 90:10 based on 100 parts by weight of a sum of the polysilazane and the reactive fluorine-containing polymer 13. If the weight ratio of the reactive fluorine-containing polymer 13 is greater than 10, that is, if an excess of the reactive fluorine-containing polymer 13 were present as compared with the polysilazane, there is a possibility of reaction of the reactive fluorine-containing polymer 13 with the polysilazane. On the other hand, if the weight ratio of the reactive fluorine-containing polymer 13 is less than 1, that is, if an excess of the polysilazane were present as compared with the reactive fluorine-containing polymer 13, the protective layer 30 of sufficient thickness may not be formed. According to the following embodiments, the coating liquid 10 may have a weight ratio of the polysilazane to the reactive fluorine-containing polymer 13 from about 97:3 to about 93:7, for example, from about 97:3 to about 95:5 based on 100 parts by weight of a sum of the polysilazane and the reactive fluorine-containing polymer 13.

In the coating liquid 10, the polysilazane may be present in an amount of about 90 parts by weight to about 99 parts by weight, for example, about 93 parts by weight to about 97 parts by weight, for example, about 95 parts by weight to about 97 parts by weight, for example, about 90, 91, 92, 93, 94, 95, 96, 97, 98, or 99 parts by weight. The reactive fluorine-containing polymer 13 may be present in an amount of about 1 part by weight to about 10 parts by weight, for example, about 3 parts by weight to about 7 parts by weight, for example, about 3 parts by weight to about 5 parts by weight, for example, about 1, 2, 3, 4, 5, 6, 7, 8, 9, or 10 parts by weight, based on 100 parts by weight of a sum of the polysilazane and the reactive fluorine-containing polymer 13. Within this range, it may be possible to obtain effects according to the weight ratio, as described above.

As shown in FIG. 1, the coating liquid 10 may be coated onto the substrate 100. Coating may be performed using a suitable method. FIG. 1 illustrates die coating (in which the coating liquid 10 is coated onto the substrate 100 through a die slit 450) as one example of coating. A coating layer (a layer formed of the coating liquid 10) may be formed on the substrate 100. The reactive fluorine-containing polymer solution 12 of the coating layer may bleed to the surface of the coating layer. In addition, the substrate 100 may be a film to which functions of the modified silica film 1 are imparted. When the functions of the modified silica film 1 are imparted to an optical film, the substrate 100 may be the optical film.

The solvent for polysilazane and the fluorine-containing solvent 14 may be removed from the coating liquid 10 on the substrate 100, that is, from the coating layer. The above solvents may be removed, for example, by heating the coating layer at about 100° C. for about 1 minute.

The polysilazane may be converted into silica (cured) while the reactive fluorine-containing polymer 13 is bonded to the polysilazane. If the polysilazane solution includes an amine catalyst, silica conversion reaction may be performed at room temperature. If the polysilazane solution does not include the amine catalyst, silica conversion reaction may be performed, for example, by heating the coating layer to about 300° C. to about 400° C. In the coating layer, a portion in which the polysilazane is mainly distributed may form the hard coating layer 20, and a portion in which the reactive fluorine-containing polymer is mainly distributed may form the protective layer 30. Thereby, the modified silica film 1 may be formed on the substrate 100. During silica conversion, a reaction represented by Formula 3 may be performed:

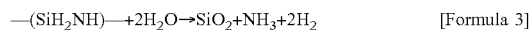

$$—(SiH_2NH)—+2H_2O \rightarrow SiO_2+NH_3+2H_2 \quad \text{[Formula 3]}$$

Structure and Properties of Modified Silica Film

The modified silica film may include silica converted from polysilazane and a fluorine-containing polymer, and may include an upper portion having a fluorine atom concentration higher than a silicon atom concentration and a lower portion having a fluorine atom concentration lower than a silicon atom concentration in a thickness direction thereof. The silicon atom concentration may decrease with increasing distance from the lower portion to the upper portion, and the fluorine atom may decrease with increasing distance from the upper portion to the lower portion, based on the thickness direction.

Hereinafter, referring to FIG. 1, FIG. 4 and FIG. 5, a structure and properties of the modified silica film 1 will be described in detail.

Figure 4:
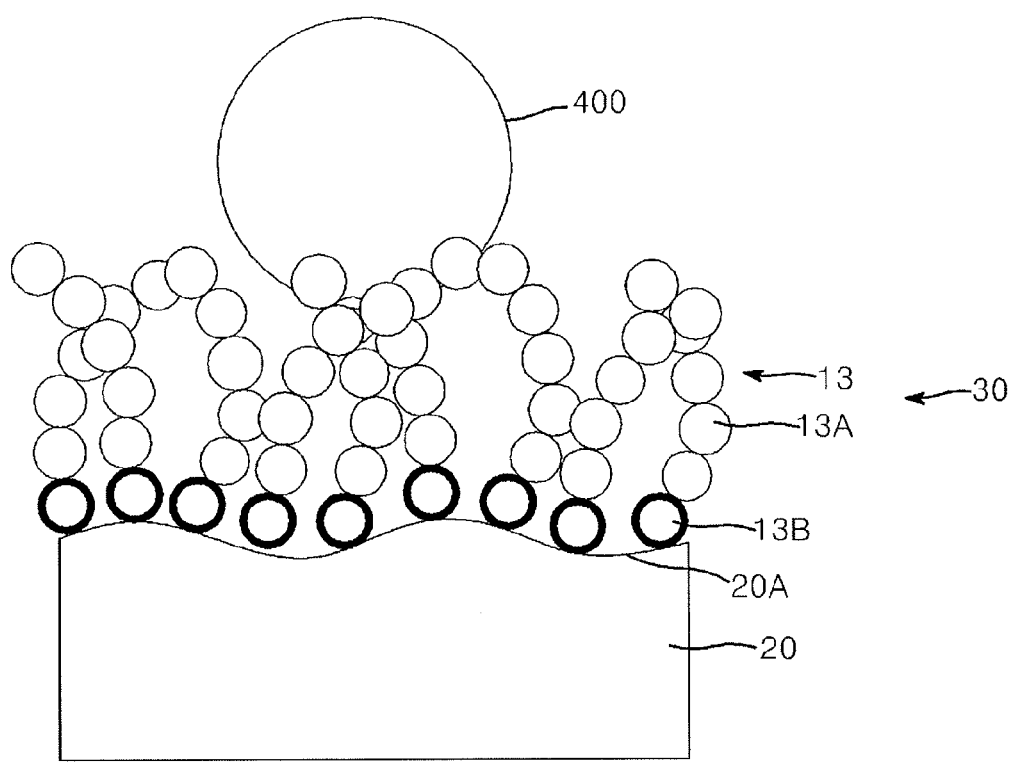
FIG. 4 illustrates an enlarged view of a surface of a modified silica film according to one embodiment.

As shown in FIGS. 1 and 4, the modified silica film 1 may include the hard coating layer 20 and the protective layer 30. The hard coating layer 20 may include the silica formed by silica conversion of the polysilazane. The protective layer 30 may include the reactive fluorine-containing polymer 13. The reactive fluorine-containing polymer 13 may be bonded to the silica of the hard coating layer 20 via the bonding group 13B.

The protective layer 30 may be formed by bleeding-out of the reactive fluorine-containing polymer 13 from inside the coating layer. The method for preparing a modified silica film according to embodiments may allow the reactive fluorine-containing polymer 13 to be naturally distributed on the surface of the hard coating layer 20, instead of the reactive fluorine-containing polymer 13 being intentionally distributed on the surface of the hard coating layer 20 as in typical bilayer coating.

The concentration distribution of the silica (concentration distribution of silicon atoms) and the concentration distribution of the reactive fluorine-containing polymer 13 (concentration distribution of fluorine atoms) may be gradually changed at an interface between the hard coating layer 20 and the protective layer 30 (for example, the change in concentration distribution may be represented by a slowly varying curve depicting that a slope of concentration change per unit layer thickness decreases, or a slope of concentration change per unit layer thickness may have a straight line shape). Although the silicon atom concentration per unit thickness may be almost 100 at % near the surface of the substrate 100, the silicon atom concentration may decrease and the fluorine atom concentration may increase with increasing distance from a measurement point on the substrate 100. In addition, the fluorine atom concentration per unit thickness may be almost 100 at % at an uppermost portion, which is a maximum distance point from the surface of the substrate, and the both atom concentrations have the same value at a certain measurement point. According to embodiments, the plane at which both atom concentrations have the same value is an interface 20A between the hard coating layer 20 and the protective layer 30. At a measurement point closer to the surface of the modified silica film 1 than the interface 20A, the fluorine atom concentration may be higher than the silicon atom concentration, and at the surface of the modified silica film 1, the fluorine atom concentration may be almost 100 at %. The protective layer 30 may include more of the silica converted from the polysilazane, and the concentration of the silica may decrease with increasing distance from a lower surface of the hard coating layer to an upper surface of the protective layer. Further, the hard coating layer may include more of the fluorine-containing polymer, and the concentration of the fluorine-containing polymer may decrease with increasing distance from the lower surface of the hard coating layer to the upper surface of the protective layer.

As shown in FIG. 4, the protective layer 30 may include protrusions and recesses formed on the surface thereof. The surface of the modified silica film 1 may be rough (protrusions and recesses may be formed on the surface thereof). According to embodiments, the interface 20A between the hard coating layer 20 and the protective layer 30 may be formed by bleeding out (natural movement) of the reactive fluorine-containing polymer 13. Accordingly, the interface 20A between the hard coating layer 20 and the protective layer 30 may be rough (protrusions and recesses may be formed on the surface thereof). The protective layer 30 formed at the interface may also have a rough surface. A surface profile of the protective layer 30 may be confirmed by observation, for example, using a scanning electron microscope (SEM) or a shape measuring laser microscope. The shape measuring laser microscope acquires three-dimensional data of an overall observation view region by performing non-contact three-dimensional measurement on a target using a laser. The shape measuring laser microscope may be, for example, a VK-9500 (KEYENCE JAPAN Co., Ltd.).

Figure 5:
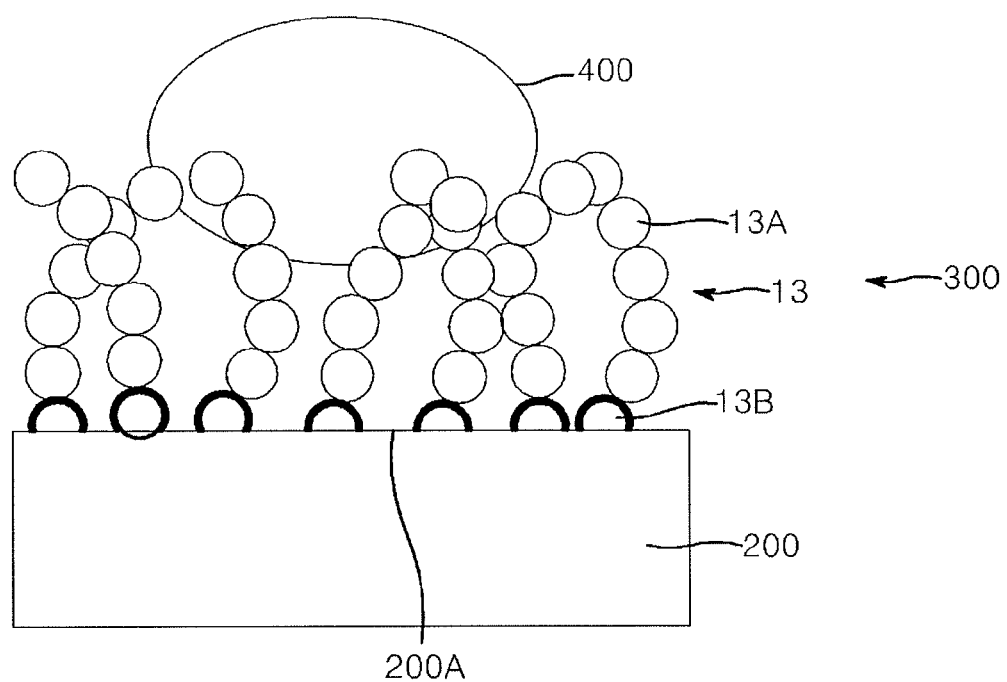
FIG. 5 illustrates an enlarged view of a surface of a typical modified silica film prepared by typical bilayer coating.

As shown in FIG. 5, in the modified silica film prepared as a typical bi-layer coating, a hard coating layer 200 including the silica is prepared first, and a protective layer 300 including the reactive fluorine-containing polymer 13 is then formed on the hard coating layer 200. Thus, an interface 200A between the hard coating layer 200 and the protective layer 300 may be extremely smooth.

In comparison of the modified silica film 1 according to embodiments with the typical modified silica film, the protrusions and the recesses are formed on the interface 20A according to embodiments. Accordingly, an area of the interface 20A may be larger than that of a typical modified silica film. As a result, more of the reactive fluorine-containing polymer 13 may be distributed at the interface 20A than in the typical modified silica film. Thus, more of the reactive fluorine-containing polymer 13 may contact a contaminant 400 than in the typical modified silica film. In addition, according to embodiments, the protrusions and the recesses may be formed on the surface of the protective layer 30. Accordingly, air may flow between the contaminant 400 and the protective layer 30. When the contaminant 400 is a liquid (for example, a liquid component of a fingerprint), the contaminant 400 may have a larger contact angle than in a typical protective layer, as shown in FIGS. 4 and 5. The surface of the modified silica film 1 may be deteriorated in wettability.

In addition, the protrusions and the recesses of the surface of the modified silica film 1 may be smooth as a result of the protrusions and the recesses being formed by natural movement (bleeding-out) of the reactive fluorine-containing polymer 13. When the contaminant 400 is a solid (for example, a wax component of a fingerprint), removal of the contaminant 400 filling the recesses may be facilitated (the contaminant may be suppressed from clinging to the surface of the modified silica film 1).

As shown in Examples described below, the modified silica film 1 may have an average surface roughness (Ra) from about 3.0 nm to about 9.0 nm of, for example, about 3.0, 3.5, 4, 4.5, 5, 5.5, 6, 6.5, 7, 7.5, 8, 8.5, or 9 nm. If the average surface roughness (Ra) is from about 3.0 nm to about 9.0 nm, at least one of scratch resistance and oleic acid sliding angle of the modified silica film 1 may be improved. The average surface roughness (Ra) is an arithmetic mean of heights of the protrusions of the protective layer 30. The height of the protrusion is a distance from the top of the protrusion to the bottom (a point closest to the hard coating layer 20) of the recess adjoining the protrusion. These values may be measured by the shape measuring laser microscope. In Examples and Comparative Examples, below, the average surface roughness was measured using a VK-9500 (KEYENCE JAPAN Co., Ltd.).

The hard coating layer may have a thickness corresponding to about 80% to about 99.8% of the total thickness of the modified silica film, and the protective layer may have a thickness corresponding to about 0.2% to about 20% of the total thickness of the modified silica film. The modified silica film may have a total thickness from about 1 μm to about 100 μm.

The silica may be present in an amount of about 90 wt % to about 99 wt %, for example, about 90, 91, 92, 93, 94, 95, 96, 97, 98, or 99 wt %, and the fluorine-containing polymer may be present in an amount of about 1 wt % to about 10 wt %, for example, about 1, 2, 3, 4, 5, 6, 7, 8, 9, or 10 wt %, based on a sum of the silica and the fluorine-containing polymer in the modified silica film. Within this range, the modified silica film may exhibit excellent strength.

The modified silica film may have a hardness of about 2H or higher, for example, from about 2H to about 3H.

The modified silica film may be a one-liquid type modified silica film formed by coating the coating liquid prepared through mixing the polysilazane solution, in which only the polysilazane is dissolved, with the reactive fluorine-containing polymer solution onto the substrate, as in the aforementioned method. The modified silica film according to embodiments may be prepared through a simple process, as compared with typical bi-layer coating, in which the polysilazane solution obtained by dissolving only the polysilazane therein is coated onto the optical film and dried, followed by silica conversion of the polysilazane, and then, coating and drying the reactive fluorine-containing polymer solution on the hard coating layer, thereby forming the protective layer on the hard coating layer.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

EXAMPLES

Example 1

In Example 1, a modified silica film is prepared by the following preparation method.

As an undiluted solution of a polysilazane solution, a NAX120-20 solution (AZ Electronic Materials Co., Ltd.) was prepared. Hereinafter, the undiluted solution will also be referred to as an "undiluted polysilazane solution". The undiluted polysilazane solution included 20 wt % of polysilazane. In addition, a solvent of the undiluted polysilazane solution was dibutylether (surface tension of 22.4), and included an amine catalyst.

Next, a predetermined amount of dibutylether was added to 9.9 parts by weight of the undiluted polysilazane solution, followed by slow stirring for 10 minutes, thereby preparing a polysilazane solution. The amount of the dibutylether added to the undiluted polysilazane solution was determined such that solids (polysilazane+reactive fluorine-containing polymer) were present in an amount of 2 parts by weight in the coating liquid.

As a reactive fluorine-containing polymer, a KY-164 solution (surface tension of 16.1, Shin-Etsu Chemical Co., Ltd.) was prepared, and as a fluorine-containing solvent, a Novec7100 (surface tension of 16.1, and boiling point of 76° C., Sumitomo 3M Co., Ltd.) was prepared. Novec7200, Novec7000, Novec7100, and Novec7300 are hydrofluoroethers.

Next, the reactive fluorine-containing polymer was dissolved in the fluorine-containing solvent, thereby preparing a reactive fluorine-containing polymer solution including 20 wt % (wt % based on a total weight of the reactive fluorine-containing polymer solution) of the reactive fluorine-containing polymer.

Next, 0.1 parts by weight of the reactive fluorine-containing polymer solution was added to the polysilazane solution, followed by stirring for 10 minutes, thereby preparing a coating liquid. The coating liquid included 2 parts by weight of solids (polysilazane+reactive fluorine-containing polymer) and 98 parts by weight of solvent. In addition, some of the coating liquid was stored for the following evaluation.

Next, the coating liquid was coated onto a poly(methyl methacrylate) (PMMA) substrate such that the modified silica film had a thickness of about 200 nm. Coating was performed using a wire bar. In this way, a coating layer was prepared. As described above, the reactive fluorine-containing polymer solution in the coating layer bled to a surface of the coating layer. Next, the coating layer was heated at 100° C. for 1 minute, thereby removing the solvent from the coating layer. All of the processes were performed under a nitrogen atmosphere.

Next, the coating layer was left at room temperature (23° C., 54% relative humidity) for one week, thereby performing silica conversion of the polysilazane while bonding the reactive fluorine-containing polymer and the polysilazane. Thus, the modified silica film was prepared.

Examples 2 to 14 and Comparative Examples 1 to 4

In Examples 2 to 14 and Comparative Examples 1 to 4, the same processes as in Example 1 were performed except that a weight ratio of the polysilazane to the reactive fluorine-containing polymer, a type of the reactive fluorine-containing polymer, a type of the fluorine-containing solvent, the presence of the fluorine-containing solvent, and the concentration of the reactive fluorine-containing polymer solution were modified. Table 1 shows the amounts (parts by weight) of the solids, the weight ratios of the polysilazane to the reactive fluorine-containing polymer, the presence of the fluorine-containing solvent, and the concentrations of the reactive fluorine-containing polymer solution according to Examples 1 to 14 and Comparative Examples 1 to 4, respectively.

TABLE 1

| | Solid in solution (wt %) | Constitution of solid (wt %) | | Fluorine-containing solvent | Concentration of fluorine-containing solution (wt %) |
|---|---|---|---|---|---|
| | | Polysilazane | Fluorine-containing polymer | | |
| Example 1 | 2 | 99 | 1 | Present | 20 |
| Example 2 | 2 | 97 | 3 | Present | 20 |
| Example 3 | 2 | 95 | 5 | Present | 20 |
| Example 4 | 2 | 93 | 7 | Present | 20 |

TABLE 1-continued

|  | Constitution of solid (wt %) | | | Concentration |
|---|---|---|---|---|
|  | Solid in solution (wt %) | Polysilazane | Fluorine-containing polymer | Fluorine-containing solvent | of fluorine-containing solution (wt %) |
| Example 5 | 2 | 90 | 10 | Present | 20 |
| Example 6 | 2 | 99 | 1 | Present | 10 |
| Example 7 | 2 | 99 | 1 | Present | 5 |
| Example 8 | 2 | 99 | 1 | Present | 3 |
| Example 9 | 2 | 99 | 1 | Present | 1 |
| Example 10 | 2 | 99 | 1 ※1 | Present | 10 |
| Example 11 | 2 | 99 | 1 ※2 | Present | 10 |
| Example 12 | 2 | 97 | 3 | Present | 30 |
| Example 13 | 2 | 97 | 3 | Present | 30 ※5 |
| Example 14 | 2 | 97 | 3 | Present | 30 ※6 |
| Comparative Example 1 | 2 | 100 | 0 | None | — |
| Comparative Example 2 | 2 | 99 | 1 | None | — |
| Comparative Example 3 | 2 | 99 | 1 ※1 | None | — |
| Comparative Example 4 | 2 | 99 | 1 ※2 | None | — |

Among the reactive fluorine-containing polymers (fluorine-containing polymer), ※1 represents KY-108 (surface tension of 16.5, Shin-Etsu Chemical Co., Ltd.), and ※2 represents OPTOOL DSX (surface tension of 15.9, Daikin Industries, Ltd.). Unmarked cases represent KY-164 (Shin-Etsu Chemical Co., Ltd.).

In the column of the concentration of the reactive fluorine-containing polymer (concentration of fluorine-containing solution), ※5 represents Novec7100 (surface tension of 13.6 and boiling point of 61° C., Sumitomo 3M Co., Ltd.), and ※6 represents Novec7300 (surface tension of 15.0 and boiling point of 98° C., Sumitomo 3M Co., Ltd.). Unmarked cases represent Novec7200.

In Examples 1 to 14, a difference calculated by subtracting the larger of the two surface tensions of the reactive fluorine-containing polymer and the fluorine-containing solvent from the surface tension of the solvent for polysilazane was found to be 5 or more. In addition, all the weight ratios of the polysilazane to the reactive fluorine-containing polymer and the concentrations of the reactive fluorine-containing polymer solutions of Examples 1 to 14 were within the ranges according to embodiments.

In Comparative Example 1, a silica film was formed only in a single layer (the protective layer was not formed). In Comparative Examples 2 to 4, the reactive fluorine-containing polymer was introduced into the polysilazane solution without being in the form of a solution with a fluorine-containing solvent.

Wiper Rubbing Test

Next, the following wiper rubbing test was performed on each of the modified silica films according to Examples and Comparative Examples.

For the wiper rubbing test, a surface of the modified silica film was rubbed with a wiper ten (10) times back and forth while a load of 500 g/cm$^2$ was applied to the surface thereof in a vertical direction (up/down direction). As the wiper, a Kimwipes wiper S-200 (NIPPON PAPER CRECIA Co., LTD.) was used.

Evaluation of Coating Liquid

Each of the coating liquids prepared in Examples and Comparative Examples was observed with the naked eye just after preparation thereof (in an initial stage) and after storage for 12 hours, thereby confirming whether the coating liquid suffered from white turbidity.

Evaluation of Contact Angle (CA)

2 µl of pure water was dropped onto the modified silica film to measure the contact angle using an automatic contact angle analyzer DM700 (Kyowa Interface Science Co., Ltd.). Contact angles of the modified silica film were measured before a wiper rubbing test (in the initial stage) and after the wiper rubbing test, respectively, thereby calculating a difference (ΔCA) therebetween. With decreasing ΔCA, it can be understood that properties of the modified silica film are less deteriorated due to the wiper rubbing test. A modified silica film with a lower ΔCA may exhibit higher scratch resistance.

Evaluation of Oleic Acid Sliding Angle

The oleic acid sliding angle was measured using an automatic contact angle analyzer (DM700, Kyowa Interface Science Co., Ltd.). Specifically, 5 µl of oleic acid was dropped onto the modified silica film before a wiper rubbing test, followed by tilting the modified silica film. Next, an angle at which the oleic acid started to move was chosen as the oleic acid sliding angle.

Evaluation of Average Surface Roughness

Average surface roughness (Ra) of the modified silica film before a wiper rubbing test was measured using a VK-9500 (KEYENCE JAPAN Co., Ltd.).

Pencil Rubbing Test

Figure 6:
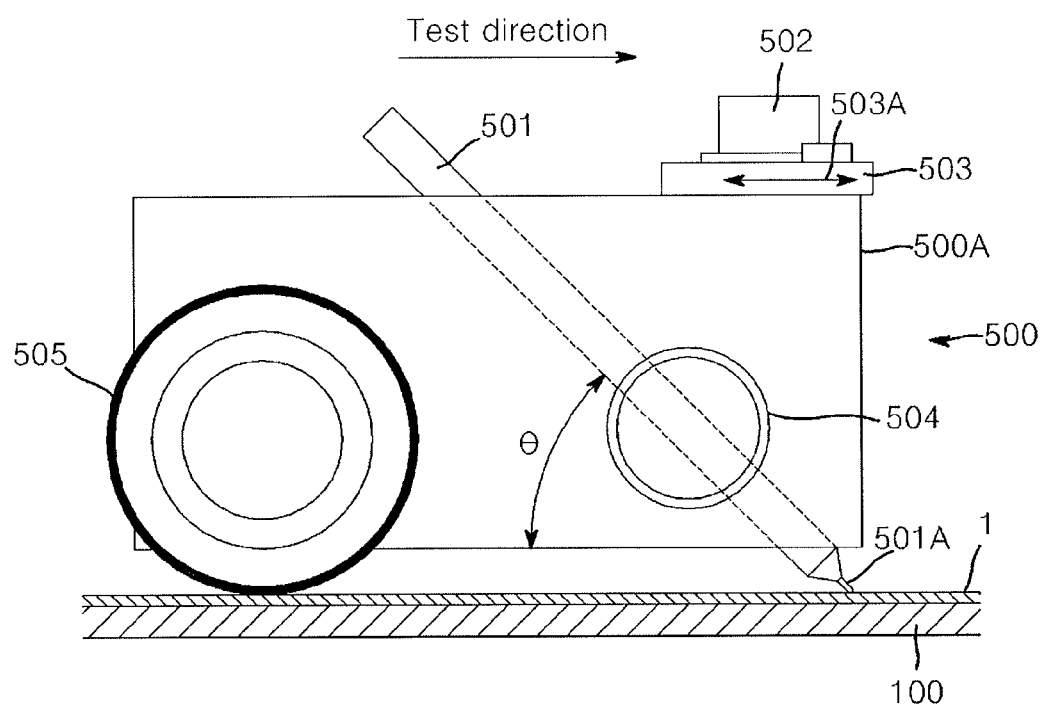
FIG. 6 illustrates a diagram showing a structure of a tester used for a pencil rubbing test.

To evaluate the strength of the modified silica film, a pencil rubbing test was performed in accordance with JIS-K-5600. Referring to FIG. 6, a tester used in the pencil rubbing test will be described in detail. FIG. 6 illustrates a situation in which the pencil rubbing test is performed on the modified silica film 1 according to embodiments using the tester 500.

The tester 500 includes a main body 500A, a level 502, a small movable weight 503, a clamp 504, and an O-ring 505. The main body 500A has a through-hole, into which a pencil 501 is inserted. An angle θ defined between a longitudinal direction of the pencil 501 inserted into the through-hole and a lower surface (that is, a surface of the modified silica film 1) of the main body 500A is 45 degrees. The level 502 is a component for confirming horizontally of the main body 500A. The small movable weight 503 is a component for adjusting load applied to a core 501A of the pencil 501. The small movable weight 503 is moveable in a direction of Arrow 503A. The clamp 504 secures the pencil 501 inside the main body 500A. The O-ring 505 is rotatably attached to the main body 500A. The O-ring 505 is rolled on the modified silica film 1, thereby moving the tester 500 in a test direction.

Next, a method for the pencil rubbing test will be described in detail. Here, the method for the pencil rubbing test will be described by way of example of the pencil rubbing test of the modified silica film 1 (formed on a substrate 100) according to embodiments.

First, the pencil 501 was inserted into the tester 500 and then secured. Next, the core of the pencil 501 was pressed down on the modified silica film 1. Next, horizontally of the tester 500 was confirmed using the level 502. Next, a position of the small movable weight 503 was adjusted, thereby applying a load of 500 g to the core 501A of the pencil 501. Next, the tester 500 was moved at a speed of 0.08 mm/sec in the test direction, as shown in FIG. 5. As a result, the core 501A of the pencil 501 rubbed the surface of the modified silica film 1. Through the above operation, the pencil rubbing test was performed. Next, occurrence of scratches was observed by the naked eye. When scratches were confirmed, hardness of the core 501A of the pencil 501 was reduced to perform the pencil rubbing test again. When the scratches were not confirmed, hardness of the core 501A of the pencil 501 was increased to perform the pencil rubbing test again. In addition, the maximum hardness (pencil hardness) at which scratches are not confirmed was measured. Hardness is a criteria for showing strength (scratch resistance) of the modified silica film 1. The values for pencil hardness are, in decreasing order, 2H>H>F>HB>B.

Comparison of Examples and Comparative Examples

Results of the above tests and evaluation are shown in Table 2.

TABLE 2

| | Evaluation result | | | | | |
|---|---|---|---|---|---|---|
| | Solution stability After 12 hours | Initial stage Pure CA (°) | After wiper rubbing Pure CA (°) | ΔCA (°) | Oleic acid (5 µl) Sliding angle (°) | Average surface roughness Ra (nm) | Pencil hardness |
| Example 1 | No change (from initial stage) | 110.3 | 106.3 | 4.0 | 8 | 6.2 | 2H |
| Example 2 | No change (from initial stage) | 111 | 107.1 | 3.9 | 7 | 6.8 | 2H |
| Example 3 | No change (from initial stage) | 111.2 | 106.9 | 4.3 | 7 | 7.1 | 2H |
| Example 4 | No change (from initial stage) | 109.6 | 104.6 | 5.0 | 9 | 7.3 | 2H |
| Example 5 | No change (from initial stage) | 109.1 | 105.1 | 4.0 | 9 | 7.7 | 2H |
| Example 6 | No change (from initial stage) | 111.3 | 107.7 | 3.6 | 7 | 6.9 | 2H |
| Example 7 | No change (from initial stage) | 111.6 | 107.8 | 3.8 | 7 | 6.8 | 2H |
| Example 8 | No change (from initial stage) | 112.3 | 107.7 | 4.6 | 7 | 7.1 | 2H |
| Example 9 | No change (from initial stage) | 110.6 | 106.1 | 4.5 | 8 | 7.6 | 2H |
| Example 10 | No change (from initial stage) | 111.1 | 106.3 | 4.8 | 8 | 5.9 | 2H |
| Example 11 | No change (from initial stage) | 110.5 | 105.8 | 4.7 | 8 | 6.5 | 2H |
| Example 12 | No change (from initial stage) | 111.7 | 103.8 | 7.9 | 9 | 8.3 | 2H |
| Example 13 | No change (from initial stage) | 110.7 | 105.8 | 4.9 | 8 | 8.6 | 2H |
| Example 14 | No change (from initial stage) | 111.3 | 106.8 | 4.5 | 7 | 6.7 | 2H |
| Comparative Example 1 | No change (from initial stage) | 61.3 | — | — | — | 1.8 | HB |

TABLE 2-continued

| | Solution stability After 12 hours | Initial stage Pure CA (°) | After wiper rubbing Pure CA (°) | ΔCA (°) | Oleic acid (5 μl) Sliding angle (°) | Average surface roughness Ra (nm) | Pencil hardness |
|---|---|---|---|---|---|---|---|
| Comparative Example 2 | White turbidity (from initial stage) | 105.9 | 96.3 | 9.6 | 15 | 9.1 | HB |
| Comparative Example 3 | White turbidity (from initial stage) | 104.9 | 97.9 | 7.0 | 13 | 13.2 | HB |
| Comparative Example 4 | White turbidity (from initial stage) | 105.8 | 96.1 | 9.7 | 14 | 11.6 | F |

White Turbidity

In comparison of the modified silica films of Examples 1 to 14 with those of Comparative Examples 1 to 4, the coating liquids of Examples 1 to 14 did not suffer from white turbidity, whereas the coating liquids of Comparative Examples 2 to 4 suffered from white turbidity from an initial stage. The coating liquid of Comparative Example 1 did not suffer from white turbidity, since the coating liquid did not include the reactive fluorine-containing polymer. In addition, the modified silica films of Examples 1 to 14 exhibited higher strength than those of Comparative Examples 1 to 4. In Comparative Examples 2 to 4, without being bound to any particular theory, it is believed that the reactive fluorine-containing polymer reacted with the polysilazane in the coating liquid, and that the modified silica film was reduced in cross-linking density as a result. It is believed that white turbidity in Comparative Examples 2 to 4 was caused by reaction of the polysilazane with the reactive fluorine-containing polymer. The silica film of Comparative Example 1 did not include the protective layer, and thus reduced in strength. Conversely, in Examples 1 to 14, the reactive fluorine-containing polymer of the coating liquid bled to the surface of the coating liquid. Accordingly, the reaction of the reactive fluorine-containing polymer with the polysilazane was suppressed. Thus, it is believed that the modified silica films of Examples 1 to 14 exhibited higher cross-linking density than those of Comparative Examples 2 to 4 and exhibited improved strength as a result.

Contact Angle and Oleic Acid Sliding Angle

The modified silica films of Examples 1 to 14 exhibited superior properties to most of the modified silica films of Comparative Examples in terms of at least one of scratch resistance (ΔCA) and oleic acid sliding angle. The modified silica films of Examples had an average surface roughness (Ra) within a range from 3.0 nm to 9.0 nm. In addition, a protective layer was formed on a surface of the silica film of Comparative Example 1 by typical bi-layer coating and had an average surface roughness of 1.8 nm. Thus, the average surface roughness according to embodiments may not be realized by a typical bi-layer coating. Further, in this case, the initial CA was 108.5°, ΔCA was 7.5°, and the sliding angle was 9°. The modified silica films of Examples were superior to that of Comparative Example 1 in terms of initial CA, ΔCA and oleic acid sliding angle.

From the results of Examples and Comparative Examples, it may be seen that the modified silica film according to embodiments had higher strength than the typical modified silica film.

By way of summation and review, a surface strength of an optical film may be improved using a silica film. An optical film may be, for example, an anti-reflective film bonded to a surface of a display.

Although good scratch resistance, antifouling properties, and the like, are desirable for an optical film, a silica film prepared by silica conversion of polysilazane may exhibit insufficient properties in term of scratch resistance, antifouling properties, and the like. As a method for modifying the silica film, a water and oil repellency imparting agent may be added to polysilazane, followed by silica conversion of the polysilazane. The water and oil repellency imparting agent may be a reactive fluorine-containing polymer having a bonding group bondable to the polysilazane.

However, polysilazane may be extremely reactive. When a reactive fluorine-containing resin is added thereto, the polysilazane may react with the reactive fluorine-containing polymer before silica conversion of the polysilazane. In addition, a reaction site of the polysilazane reacting with the reactive fluorine-containing polymer may not be cross-linked with a surrounding silica skeleton upon silica conversion. A silica film prepared in this manner may have low cross-linking density and strength. Reaction of the reactive fluorine-containing polymer with the polysilazane may be confirmed by deterioration in strength of the modified silica film. Some of the reactive fluorine-containing polymer may cause white turbidity of a polysilazane solution through reaction with the polysilazane. Reaction of the reactive fluorine-containing polymer with the polysilazane may also be confirmed by such white turbidity.

In an effort to address such issues, a bilayer coating method may include coating and drying a polysilazane solution, in which only polysilazane is dissolved, on an optical film, followed by silica conversion of the polysilazane to form a silica film as a hard coating layer on the optical film. A reactive fluorine-containing polymer solution may be coated onto the hard coating layer, followed by drying, thereby forming a protective layer on the hard coating layer. However, in a bilayer coating formed by such a method, coating is performed twice, and each coating must be performed with high precision (for example, without defects). Much work may be required for preparation of the hard coating layer and the protective layer. Due to such a problem, the optical film including the hard coating layer and the protective layer prepared by bilayer coating may be extremely expensive, and thus is not universally available.

As described above, according to embodiments, the coating liquid 10 may be prepared by mixing the polysilazane solution 11 with the reactive fluorine-containing polymer solution 12. In addition, the coating layer may be formed by coating the coating liquid 10 onto the substrate 100. The reactive fluorine-containing polymer solution 12 of the coating layer may naturally bleed to the surface of the coating layer. The modified silica film 1, that is, the hard coating layer 20 and the protective layer 30, may be formed by coating the coating liquid 10 onto the substrate 100 as one layer. The modified silica film 1 may be easily prepared. The reactive fluorine-containing polymer solution 12 of the coating layer may bleed to the surface of the coating layer. Accordingly, reaction of the reactive fluorine-containing polymer 13 with the polysilazane may be suppressed. The modified silica film may exhibit improved strength as compared with the typical modified silica film.

A difference calculated by subtracting the larger of the two surface tensions of the reactive fluorine-containing polymer 13 and the fluorine-containing solvent 14 from the surface tension of the solvent for polysilazane may be 5 or more. Accordingly, the reactive fluorine-containing polymer solution 12 may more efficiently bleed to the surface of the coating layer.

The solvent for polysilazane may be a hydrophobic and non-polar organic solvent, and thus may be immiscible with the fluorine-containing solvent 14. The reactive fluorine-containing polymer solution 12 may more efficiently bleed to the surface of the coating layer.

The solvent for polysilazane may include at least one selected from the group of dibutylether, xylene, mineral turpentine, petroleum hydrocarbons, and high boiling point aromatic hydrocarbons. These solvents may be immiscible with the fluorine-containing solvent 14. The reactive fluorine-containing polymer solution 12 may more efficiently bleed to the surface of the coating layer.

The fluorine-containing solvent may include a hydrofluoroether. This solvent may have lower surface tension than the solvent for polysilazane, and may be immiscible with the solvent for polysilazane. The reactive fluorine-containing polymer solution 12 may more efficiently bleed to the surface of the coating layer.

The modified silica film 1 may have an average surface roughness from 3.0 nm to 9.0 nm. At least one of scratch resistance and oleic acid sliding angle thereof may be improved.

The reactive fluorine-containing polymer solution of the coating layer may naturally bleed to the surface of the coating layer. Thus, the modified silica film, that is, the hard coating layer and the protective layer, may be formed by only coating the coating liquid onto the substrate as one layer. The modified silica film may be easily prepared. The reactive fluorine-containing polymer solution of the coating layer may bleed to the surface of the coating layer. Reaction of the reactive fluorine-containing polymer with the polysilazane may be suppressed. The modified silica film may exhibit improved strength as compared with a typical modified silica film.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope as set forth in the following claims.

What is claimed is:

1. A method for preparing a modified silica film, the method comprising:
    providing a reactive fluorine-containing polymer solution, the reactive fluorine-containing solution including a fluorine-containing solvent and a reactive fluorine-containing polymer including a bonding group bondable to polysilazane, the reactive fluorine-containing polymer being dissolved in the fluorine-containing solvent;
    providing a polysilazane solution, the polysilazane solution including a polysilazane and a solvent for polysilazane, the solvent for polysilazane being immiscible with the fluorine-containing solvent and exhibiting a higher surface tension than the reactive fluorine-containing polymer and a higher surface tension than the fluorine-containing solvent, the polysilazane being dissolved in the solvent for polysilazane;
    preparing a coating liquid by mixing the polysilazane solution with the reactive fluorine-containing polymer solution;
    forming a coating layer by coating the coating liquid onto a substrate;
    removing the solvent for polysilazane and the fluorine-containing solvent from the coating layer; and
    converting the polysilazane into silica while bonding the bonding group of the reactive fluorine-containing polymer to the polysilazane.

2. The method as claimed in claim 1, wherein a difference in surface tension calculated by subtracting a larger surface tension of two surface tensions of the reactive fluorine-containing polymer and the fluorine-containing solvent from surface tension of the solvent for polysilazane is about 5 mN/m or more.

3. The method as claimed in claim 1, wherein the solvent for polysilazane is a hydrophobic and non-polar organic solvent.

4. The method as claimed in claim 3, wherein the solvent for polysilazane includes at least one selected from the group of dibutylether, xylene, mineral turpentine, petroleum hydrocarbons, and aromatic hydrocarbons with a high boiling point.

5. The method as claimed in claim 1, wherein the fluorine-containing solvent includes a hydrofluoroether.

6. The method as claimed in claim 1, wherein a weight ratio of the polysilazane to the reactive fluorine-containing polymer in the coating liquid ranges from about 99:1 to about 90:10.

7. The method as claimed in claim 1, wherein the reactive fluorine-containing polymer solution includes about 1 wt % to about 30 wt % of the reactive fluorine-containing polymer based on a total weight of the reactive fluorine-containing polymer solution.

8. The method as claimed in claim 1, wherein the fluorine-containing solvent has a boiling point of about 61° C. or more.

9. A coating liquid, comprising:
    polysilazane, a reactive fluorine-containing polymer, a solvent for polysilazane, and a fluorine-containing solvent,
    wherein a difference in surface tension calculated by subtracting a larger surface tension of the surface tension of the reactive fluorine-containing polymer and the surface tension of the fluorine-containing solvent from surface tension of the solvent for polysilazane is about 5 mN/m or more.

10. The coating liquid as claimed in claim 9, wherein the solvent for polysilazane is a hydrophobic and non-polar organic solvent.

11. The coating liquid as claimed in claim 9, wherein the solvent for polysilazane includes at least one selected from the group of dibutylether, xylene, mineral turpentine, petroleum hydrocarbons, and aromatic hydrocarbons with a high boiling point.

12. The coating liquid as claimed in claim 9, wherein the fluorine-containing solvent includes a hydrofluoroether.

13. The coating liquid as claimed in claim 9, wherein the fluorine-containing solvent has a surface tension of about 15 mN/m or less and a boiling point of about 61° C. or more.

14. The coating liquid as claimed in claim 9, further comprising an amine catalyst.

15. The coating liquid as claimed in claim 9, wherein a weight ratio of the polysilazane to the reactive fluorine-containing polymer in the coating liquid ranges from about 99:1 to about 90:10.

16. The coating liquid as claimed in claim 9, wherein the reactive fluorine-containing polymer solution includes about 1 wt % to about 30 wt % of the reactive fluorine-containing polymer based on a total weight of the reactive fluorine-containing polymer solution.

17. A modified silica film prepared by the method for preparing a modified silica film as claimed in claim 1.

18. The modified silica film as claimed in claim 17, wherein a difference in surface tension calculated by subtracting a larger surface tension of two surface tensions of the reactive fluorine-containing polymer and the fluorine-containing solvent from surface tension of the solvent for polysilazane is about 5 mN/m or more.

19. The modified silica film as claimed in claim 17, wherein the fluorine-containing solvent includes a hydrofluoroether.

20. The modified silica film as claimed in claim 17, wherein the fluorine-containing solvent has a boiling point of 61° C. or more.

* * * * *